United States Patent [19]

Sugio et al.

[11] 4,211,857

[45] Jul. 8, 1980

[54] METHOD FOR PRODUCING POLYPHENYLENE OXIDES

[75] Inventors: Akitoshi Sugio, Ohmiya; Takeo Kawaki, Tokyo, both of Japan

[73] Assignee: Mitsubishi Gas Chemical Company, Inc., Tokyo, Japan

[21] Appl. No.: 24,568

[22] Filed: Mar. 28, 1979

[30] Foreign Application Priority Data

Apr. 4, 1978 [JP] Japan .................. 53-39350

[51] Int. Cl.$^2$ .............................................. C08G 65/44
[52] U.S. Cl. ...................................... 528/215; 526/60; 526/71; 528/212
[58] Field of Search .................. 528/215, 212; 526/60, 526/71

[56] References Cited

U.S. PATENT DOCUMENTS

| | | | |
|---|---|---|---|
| 3,257,358 | 6/1966 | Stamatoff | 528/215 |
| 3,306,875 | 2/1967 | Hay | 528/215 |
| 3,313,776 | 4/1967 | Borman | 528/215 |
| 3,432,466 | 3/1969 | Hay | 526/71 |
| 4,028,341 | 6/1977 | Hay | 528/215 |

*Primary Examiner*—Lester L. Lee

[57] ABSTRACT

In the oxidation-polycondensation of a monohydric phenol in a reaction vessel equipped with a reflux condenser, in the presence of a complex catalyst comprising a copper compound and an amine, while passing an oxygen-containing gas thereinto, an improvement is provided wherein the temperature of the oxygen-containing gas to be discharged through the reflux condenser is adjusted to a range of 10°–25° C. to adequately maintain the balance of an amine and water during the course of the reaction. According to this improvement, the reaction advances well although a small amount of the amine escapes outside the reaction system along with a part of water resulting from the reaction. Further, the polymerization reaction can be repeated in a very stabilized state without any fluctuation of reaction time unlike the conventional method wherein the discharged gas through the reflux condenser is deeply cooled down to a temperature lower than 0°C.

6 Claims, No Drawings

METHOD FOR PRODUCING POLYPHENYLENE OXIDES

BACKGROUND OF THE INVENTION

The present invention relates to a method for producing polyphenylene oxides from monohydric phenols, and more particularly it relates to a method wherein monohydric phenols are subjected to oxidation-polycondensation in a reaction vessel with an oxygen-containing gas blown into the vessel in the presence of a complex catalyst of a copper compound and an amine to produce polyphenylene oxides, and in this case, the temperature of gas discharged from a reflux condenser fixed onto the reaction vessel is adjusted to a suitable temperature, whereby the amounts of the amine and water present in the reaction system are adjusted and hence the polymerization reaction can be carried out rapidly and without any fluctuation of reaction time.

The copper-amine complex catalyst promotes an oxidation of a hydrogen atom of a hydroxy group and a hydrogen atom at a para-position in a monohydric phenol molecule to result in a catalytic polycondensation of the monohydric phenol, and this catalytic action is greatly influenced by the proportion of the amounts of a copper compound and an amine forming the complex catalyst.

Further, although the oxidation-polycondensation is indispensable for water formation, an increase of the amount of water formed during the reaction has an adverse influence upon the polymerization to reduce the reaction rate. The respective proportions of the amounts of a copper compound, an amine, water, etc., vary with the progress of the reaction, as mentioned above, and nevertheless, it is required to enhance the reaction rate, i.e. to control the reaction conditions so as to maintain the catalyst activity constantly.

Heretofore, the method of subjecting phenols to the oxidation-polycondensation in the presence of a catalyst of the copper-amine complex to produce polyphenylene oxides has been carried out heeding a solution of phenols dissolved in a solvent, into a polymerization reaction vessel equipped with an agitating element, and vigorously agitating the reaction contents while blowing oxygen or an oxygen-containing gas thereinto. According to the above-mentioned method, since the amine which is a ligand of the complex catalyst escapes outside the reaction system is company with the oxygen-containing gas blown into the reaction system, the amount of the amine in the reaction system is reduced and the proportion of the amounts of copper and amine varies to reduce the catalyst activity.

Thus, in order to overcome such a drawback, various methods have been attempted, such as a method wherein the gas to be discharged outside the reaction system is deeply cooled by a reflux condenser fixed to the polymerization reaction vessel to collect the amine and return it to the reaction system, a method wherein the gas blown in the reaction system in a closed system is used in a circulation manner while oxygen consumed in the reaction is supplemented, to prevent the amine from escaping out of the reaction system, and the like methods. Further, in order to remove water, various methods have been proposed, such as a method wherein anhydrous magnesium sulfate is added to the reaction system in advance to remove the resulting water in the form of water of crystallization, a method wherein the resulting water is adsorbed by molecular sieves to remove it, a method wherein a gas discharged outside the reaction system and containing a solvent, an amine and water is deeply cooled, a condensate is recovered, and then the solvent and the amine obtained by separation of water from the condensate are returned to the reaction system to adjust the amounts of the solvent and the amine in the reaction system, and the like methods.

SUMMARY OF THE INVENTION

The object of the present invention is to provide a method wherein a oxidation-polycondensation of monohydric phenols can be carried out within the shortest polymerization time and without any fluctuation of the polymerization time to produce polyphenylene oxides of good quality and high performance.

In order to achieve the above-mentioned object, the present inventors have made various studies, particularly on a method for controlling the amount of the amine in the polymerization reaction system so as to give an adequate amount in accordance with the progress of the polymerization reaction and the amount of water in the polymerization reaction system suitable for the progress of the polymerization reaction, which is determined by studying azeotropic equlibrium data in the reaction system, to thereby advance the polymerization reaction of monohydric phenols in a very stabilized state, and as a result, have attained the present invention.

The present invention resides in the following method:

In the method for producing polyphenylene oxides from monohydric phenols by subjecting monohydric phenols to an oxidation-polymerization in a reaction vessel equipped with a reflux condenser, with an oxygen-containing gas in the presence of a catalyst comprising a copper compound and an amine, while passing said gas into the vessel, an improvement which comprises adjusting the temperature of the oxygen-containing gas to be discharged from said reflux condenser within a range of 10°–25° C.

DETAILED DESCRIPTION OF THE INVENTION

In the production of polyphenylene oxides, it is desired that a reaction operation can be steadily carried out in as short a reaction time as possible and without any fluctuation of reaction time to obtain constantly polyphenylene oxides of good quality and high performance, as in the production methods of many chemical industries.

With regard to the polycondensation reaction wherein monohydric phenols are subjected to oxidation-polymerization in a reactor equipped with a reflux condenser to produce polyphenylene oxides, the present inventors have made strenuous studies on the polymerization conditions and manners for making the reaction faster and reducing the fluctuation of the reaction time as much as possible, and as a result have found that according to the method of merely suppressing escape of an amine, or the method of a mere removal of water, as in conventional methods, the above-mentioned object cannot be fully attained, and it is important to maintain the amounts of an amine and water present in the reaction system, within their adequate ranges during the course of the reaction. Namely the present inventors have found that, when the gas to be discharged outside the reaction system is deeply cooled down to −20° C.

by means of a reflux condenser fixed onto the polymerization reactor to thereby scarcely allow the amine contained in the gas to escape, almost all of the amine is returned to the reaction system through the reflux, but no reaction heat is generated even at the initial stage of the reaction on account of change in a certain condition and the reaction scarcely occurs, whereas, even in case where the gas to be discharged outside the reaction system is not sufficiently cooled and a part of the gas is discharged, if the escape of an amine is restricted within a definite range of its amount, the reaction proceeds at a sufficient polymerization rate.

These findings lead to an inference that, in order to carry out the oxidation-polycondensation reaction rapidly and without any fluctuation of reaction time, it will be necessary to maintain the balance between an amine and water during the course of the reaction, in a state suitable to highly maintain the catalyst activity.

In other words, it is anticipated from the above-mentioned fact that the adequate balance of an amine shifts in relation to an amount of water formed during the course of the reaction while the amount of an amine is maintained within an allowable range in accordance with the progress of the polymerization reaction. Thus, it can be seen that if the balance between an amine and water formed during the course of the reaction is maintained in the form of following the progress of the polymerization reaction, there occurs no obstacle to the progress of the polymerization reaction even if a certain amount of amine escapes outside the reaction system.

In the general conventional method, a deep cooling of the oxygen-containing gas to be discharged outside the reaction system to a temperature lower than 0° C. has been carried out to recover an amine and a solvent as such as possible. But according to the above-mentioned knowledges of the present inventors, it is not suitable to forcibly carry out such a deep cooling because the balance between an amine and water in the reaction system is broken. Rather it is necessary to adjust the returning ratio of the effluent to preceed the polymerization without any fluctuation of the reaction time and hence to advance the polymerization reaction in a stabilized manners.

Based on these knowledges, the present inventors have made studies on the conditions under which the balance of an amine and water in the reaction system is adequately maintained during the course of the reaction so that the catalyst activity may be highly maintained. As a result it has been found that the above-mentioned conditions can be easily satisfied by controlling the temperature of the oxygen-containing gas discharged from the reflux condenser.

Such a temperature of the discharged gas depends on the reaction temperature and the amount of the gas blown into the reactor, and as for the temperature of the discharged gas suitable to the object of the present invention, the temperature should be adjusted within a range of 10°–25° C., preferably 15°–20° C.

If the temperature of the discharged gas from the above-mentioned reflux condenser is maintained at −20° C. or lower, the polymerization reaction substantially does not proceed; As the temperature raises higher than −20° C., the reaction begin to proceed; at 10° C. or higher, the reaction becomes notably rapid; at about 20° C., the reaction rate reaches its maximum; and if it exceeds 25° C., the reaction rate successively decreases to the contrary.

As a result, it can be regarded that the amounts of amine and formed water escaping from the reflux condenser and the proportion of these amounts are adequate at a temperature in the vicinity of 20° C. at the exit of the condenser and hence the amounts of copper, amine and water in the reaction system are most adequately maintained throughout the polymerization reaction. Heretofore, the reaction times required for producing polymers having the same degree of polymerization have had a considerable fluctuation, but, by controlling the temperature of the discharged gas according to the method of the present invention, it has become possible not only to increase the polymerization rate, but also to reduce the reaction time required.

The monohydric phenols to be subjected to oxidation-polycondensation according to the present invention are expressed by the general formula

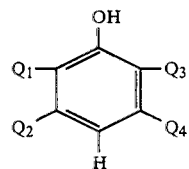

(wherein $Q_1$ represents a monovalent substituent selected from hydrogen atom and alkyl group and $Q_2$, $Q_3$ and $Q_4$ each represent a monovalent substituent selected from the group consisting of hydrogen atom, alkyl group, chlorine atom and bromine atom). Concretely, 2,6-xylenol, 2,6-diethylphenol, 2,6-dipropylphenol, 2,6-dilaurylphenol, 2-methyl-6-ethylphenol, 2,3,6-trimethylphenol, 2,3,5,6-tetramethylphenol, etc. are illustrated.

The polymers produced from these phenols according to the method of the present invention are polyphenylene oxides having as their structural unit, a phenoxy group expressed by the general formula

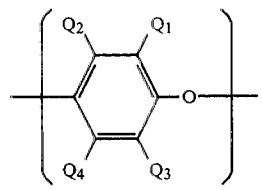

(wherein $Q_1$, $Q_2$, $Q_3$ and $Q_4$ each represent the same meanings as defined above and n represents preferably an integer of 50 or more).

Further, the polyphenylene oxides produced according to the method of the present invention include not only homopolymers but also copolymers produced by employing a mixture of two kinds or more of phenols. In the polymerization reaction, the above-mentioned phenols may be in the whole amount fed into a catalyst solution from the beginning of the polymerization reaction, but in this case, since a diphenoquinone is byproduced and also the polymerization rate is reduced, a method of dropwise adding phenols into a catalyst solution is preferable.

As for the copper compound for the complex catalyst of copper-amine, various ones may be employed, and among them, cuprous iodide is preferable. As for the amine, i-propylamine, n-butylamine, mono- and di-cyclohexylamines, amylamine, laurylamine, benzylamine, β-phenylethylamine, 2-ethylhexylamine, N,N,N',N'-tetramethylethylenediamine, N,N,N',N'-tetramethyl-1, 3-propanediamine, N,N,N',N'-tetramethylhexamethylenediamine, etc. are illustrated. Among combinations of these copper compounds and amines, a combination of cuprous iodide and n-butylamine is particularly preferable.

Further, the reaction is carried out in a solvent, and for the solvent, aromatic hydrocarbons such as benzene, toluene, xylenes, O-dichlorobenzene or the like, are preferably employed, and hologenated hydrocarbons such as dichloromethane, trichloroethylene or the like may be also employed.

As for the oxygen-containing gas, air is usually employed although oxygen or oxygen diluted with an inert gas may be also employed. Further as for the oxygen-containing gas, it is preferable that the gas is blown into the reaction system lest its amount blown into the system should determine the reaction rate, and too small an amount is unsuitable. On the other hand, if the amount is too large, the amount of an amine which is accompanied with the gas and escapes from the reaction system increases to reduce the reaction rate. Accordingly, it is preferable that the amount is 1–5 times, particularly 1,2–3 times the theoretical amount of oxygen to be consumed.

In the above-mentioned polymerization reaction, the temperature within the reaction vessel is usually maintained at a temperature of about 30°–50° C. If the temperature of the reaction system is too high, the partial pressure of oxygen in the reaction system is decreased and the polymerization reaction can not take place smoothly. While, if the temperature is too low, the solubility of the polymer is decreased and then the polymer having an insufficient degree of polymerization is deposited, and moreover the danger of explosion is also taken place.

According to the present invention, it is possible not only to enhance the polymerization rate of the oxidation-polymerization reaction of monohydric phenols, but also to carry out a stabilized production process without any fluctuation of reaction time as well as a product control, and a practically very advantageous method for producing polyphenylene oxides is provided.

EXAMPLE 1

Toluene (1050 g) and a solution of cuprous iodide (0.875 g) dissolved in n-butylamine (120 g) were introduced into a reaction vessel equipped with a stirrer, a reflux condenser and an air-blowing-in tube, and then warmed to 37° C. This solution was vigorously agitated and air was passed into the solution at a rate of 3 l/min. Just thereafter a solution of 2, 6 xylenol (174.7 g) dissolved in toluene (700 g) was dropwise added to initiate the reaction. The reaction temperature was maintained at 40° C., and toluene, the amine and water accompanied by air and going to escape were cooled and collected by the reflux condenser where the temperature of the discharged gas was controlled so as to be 20° C. The resulting collected fraction was returned to the reaction system. 65 Minutes were required for obtaining a polymer having an intrinsic viscosity of 0.55 dl/g (as measured in chloroform at 25° C.) under these conditions. The polycondensation reaction was repeated 10 times under the same reaction conditions, and the times required for obtaining polymers having an intrinsic viscosity of 0155 dl/g were in the range of 64–66 minutes, and thus it was observed that the fluctuation of reaction time was very small. Further the amount of n-butylamine after completion of the reaction under these conditions was 78% of the amount thereof fed. In addition, the intrinsic viscosity was measured as follows: After completion of the reaction, the reaction liquid is soon taken out, methanol containing hydrochloric acid is added thereto to precipitate a polymer, which is then filtered, washed and dried at 100° C. for 24 hours. The resulting polymer is subjected to measurement of intrinsic viscosity employing chloroform as a solvent at 25° C.

The reaction conditions and results of this Example are summarized in the following Table 1.

Table 1

| Amine | Copper compound | Monohydric phenol | Temperature in the reactor | Amount of air blown in | Temperature of a discharged air | Polymerization time | Percentage of a residual amine |
|---|---|---|---|---|---|---|---|
| n-Butyl amine 120g | Cuprous iodide 0.875g | 2,6-Xylenol 174.7g | 40° C. | 3 l/min | 20° C. | 64–66 min. | 78% |

EXAMPLE 2

Polycondensation reaction was carried out in the same manner as in Example 1 except that a solution of 2,6-xylenol (166.2 g) and 2,3,6-trimethylphenol (9.75 g) as monohydric phenols dissolved in 700 g of toluene was added. As a result, 65 minutes were required for obtaining polymers having an intrinsic viscosity of 0.55 dl/g (as measured in chloroform at 25° C.). This preparation of copolymer was repeated 10 times, and the time required for obtaining copolymers having an intrinsic viscosity of 0.55 dl/g was in the range of 64–66 minutes. Further, the amount of n-butylamine which remained in the reaction system after completion of the reaction under the conditions was 79% of the amount thereof fed.

The reaction conditions and results of this Example are summarized in the following Table 2.

Table 2

| Amine | Copper compound | Monohydric phenol | Temperature in the reactor | Amount of air blown in | Temperature of a discharged air | Polymerization time | Percentage of a residual amine |
|---|---|---|---|---|---|---|---|
| n-Buthyl amine 120g | Cuprous iodide 0.875g | 2,6-Xylenol 166.2g 2,3,6-Trimethyl | 40° C. | 3 l/min | 20° C. | 64–68 min | 79% |

Table 2-continued

| Amine | Copper compound | Monohydric phenol | Temperature in the reactor | Amount of air blown in | Temperature of a discharged air | Polymerization time | Percentage of a residual amine |
|---|---|---|---|---|---|---|---|
| | | phenol 9.75g | | | | | |

EXAMPLES 3 AND 4

Example 2 was repeated except that the temperature of the gas discharged from the reflux condenser was rendered 10° C. and 25° C., and as a result, the times required for obtaining polymers having an intrinsic viscosity of 0.55 dl/g (as measured in chloroform at 25° C.) were 66 minutes and 67 minutes, respectively.

The reaction conditions and results of these Examples are shown in the following Table 3.

COMPARATIVE EXAMPLE 4

Polycondensation reaction was attempted in the same manner as in Example 2 except that the gas to be discharged from the reflux condenser was deeply cooled down to −20° C. and the resulting condensate was returned to the reaction system. In this case, the reaction proceeded generating heat for the initial 7 minutes, but thereafter there was no heat generation and the reaction ceased, as also described in the following Table 5.

Table 3

| | Amine | Copper compound | Monohydric phenol | Temperature in the reactor | Amount of air blown in | Temperature of a discharged air | Polymerization time |
|---|---|---|---|---|---|---|---|
| | n-Buthyl amine | Cuprous iodide | 2,6-Xylenol 2,3,6-Trimethyl phenol | | | | |
| Ex. 3 | 120g | 0.875g | 166.2g 9.75g | 40° C. | 3 l/min | 10° C. | 66 min |
| Ex. 4 | 120g | 0.875g | 166.2g 9.75g | 40° C. | 3 l/min | 25° C. | 67 min |

Table 5

| Amine | Copper compound | Monohydric phenol | Temperature in the reaction | Amount of air blown in | Temperature of discharged air | Polymerization time |
|---|---|---|---|---|---|---|
| n-Butyl amine 120g | Cuprous iodide 0.875g | 2,6-Xylenol 2,3,6-Trimethyl phenol 166.2g 9.75g | 40° C. | 3 l/min | −20° C. | Reaction proceeded only for the initial 7 minutes |

COMPARATIVE EXAMPLES 1-3

Polycondensation reactions were carried out in the same conditions as in Example 1 except that the amounts of n-butylamine were changed to 114 g, 111 g and 60 g. As a result, the average reaction times required for obtaining polymers having an intrinsic viscosity of 0.55 dl/g (as measured in chloroform at 25° C.) were as shown in the following Table 4.

COMPARATIVE EXAMPLE 5

Example 2 was repeated except that the gas discharged from the reflux condenser was collected at 32°-34° C. and the resulting condensate was returned to the reaction system. After 75 minutes, a polymer having an intrinsic viscosity of 0.55 dl/g (as measured in chloroform at 25° C.) was obtained. Further, the amount of the amine contained in the reaction liquid after completion of the reaction was 74% of the amount of the amine Table 4

| | Amine | Copper compound | Monohydric phenol | Temperature in the reaction | Amount of air blown in | Temperature of a discharged air | Polymerization time |
|---|---|---|---|---|---|---|---|
| | n-Butyl amine | Cuprous iodide | 2,6-Xylenol | | | | |
| Comp.1 | 114g | 0.875g | 174.7g | 40° C. | 3 l/min | 20° C. | 70 min |
| Comp.2 | 111g | 0.875g | 174.7g | 40° C. | 3 l/min | 20° C. | 80 min |
| Comp.3 | 60g | 0.875g | 174.7g | 40° C. | 3 l/min | 20° C. | longer than 7 hours | fed. The reaction conditions and results of this Comparative example are summarized in the following Table 6.

Table 6

| Amine | Copper compound | Monohydric phenol | Temperature in the reactor | Amount of air blown in | Temperature of discharged air | Polymerization time | Percentage of a residual amine |
| --- | --- | --- | --- | --- | --- | --- | --- |
| n-butyl amine 120g | Cuprous icalde 0.875g | 2,6-Xylenol 2,3,6-Trimethyl phenol [ 166.2g 9.75% | 40° C. | 3 l/min | 32°–34° C. | 75 min | 74% |

COMPARATIVE EXAMPLE 6

Example 2 was repeated except that the temperature at the exit of the reflux condenser was made 0° C. As a result, the times required for obtaining polymers having an intrinsic viscosity of 0.55 dl/g (as measured in chloroform at 25° C.) were fluctuated between 72 minutes and 83 minutes. Further, the amount of the amine contained in the reaction liquid after completion of the reaction was 84% of the amount of amine fed. The reaction condition and results of this Comparative example are shown in the following Table 7.

Table 7

| Amine | Copper compound | Monohydric phenol | Temperature in the reactor | Amount of air blown in | Temperature of discharged air | Polymerization time | Percentage of a residual amine |
| --- | --- | --- | --- | --- | --- | --- | --- |
| n-Butyl amine 120g | Cuprous iodide 0.875g | 2,6-Xylenol 40° C. 2,3,6-Trimethyl phenol [ 166.2g 9.75g |  | 3 l/min | 32°–34° C. | 75 min | 84% |

What is claimed is:

1. In the method for producing polyphenylene oxides from monohydric phenols by subjecting a monohydric phenol to an oxidation-polycondensation in a reaction vessel equipped with a reflux condenser, with an oxygen-containing gas in the presence of a complex catalyst comprising a copper compound and an amine, while passing said gas into the vessel, an improvement which comprises adjusting the temperature of the oxygen-containing gas to be discharged through said reflux condenser within a range of 10°–25° C.

2. An improvement according to claim 1 wherein said complex catalyst is composed of cuprous iodide and n-butylamine.

3. An improvement according to claim 1 wherein said monohydric phenol is 2,6-xylenol.

4. An improvement according to claim 1 wherein said monohydric phenol is a mixture of 2,6-xylenol with 2,3,6-trimethylphenol.

5. An improvement according to claim 1 wherein the reaction temperature of said oxidation-polycondensation is in the range of 30°–50° C.

6. An improvement according to claim 1 wherein said oxygen-containing gas is passed into said reaction vessel in an amount capable of feeding oxygen corresponding to 1–5 times the theoretical amount of oxygen required for said oxidization-polycondensation.

* * * * *